US008255978B2

(12) United States Patent
Dick

(10) Patent No.: US 8,255,978 B2
(45) Date of Patent: Aug. 28, 2012

(54) VERIFIED PERSONAL INFORMATION DATABASE

(75) Inventor: Richard Dick, Alpine, UT (US)

(73) Assignee: Innovatrend, Inc., Alpine, UT (US)

( * ) Notice: Subject to any disclaimer, the term of this patent is extended or adjusted under 35 U.S.C. 154(b) by 793 days.

(21) Appl. No.: 10/799,921

(22) Filed: Mar. 10, 2004

(65) Prior Publication Data

US 2005/0005168 A1    Jan. 6, 2005

Related U.S. Application Data

(60) Provisional application No. 60/433,356, filed on Mar. 11, 2003.

(51) Int. Cl.
*H04L 29/06* (2006.01)
(52) U.S. Cl. .......................................................... 726/4
(58) Field of Classification Search ...................... 726/4
See application file for complete search history.

(56) References Cited

U.S. PATENT DOCUMENTS

| | | | | |
|---|---|---|---|---|
| 6,134,327 | A * | 10/2000 | Van Oorschot | 380/30 |
| 6,289,460 | B1 * | 9/2001 | Hajmiragha | 726/28 |
| 6,517,587 | B2 * | 2/2003 | Satyavolu et al. | 715/234 |
| 6,651,060 | B1 * | 11/2003 | Harper et al. | 707/9 |
| 6,754,665 | B1 | 6/2004 | Futagami et al. | |
| 6,804,787 | B2 * | 10/2004 | Dick | 726/1 |
| 6,931,419 | B1 * | 8/2005 | Lindquist | 707/792 |
| 7,028,049 | B1 * | 4/2006 | Shelton | 707/104.1 |
| 7,076,558 | B1 * | 7/2006 | Dunn | 709/229 |
| 7,234,064 | B2 * | 6/2007 | Menschik et al. | 713/193 |
| 7,302,569 | B2 * | 11/2007 | Betz et al. | 713/167 |
| 2001/0041991 | A1 * | 11/2001 | Segal et al. | 705/3 |
| 2001/0047281 | A1 | 11/2001 | Keresman, III et al. | |
| 2001/0047282 | A1 * | 11/2001 | Raveis, Jr. | 705/7 |
| 2001/0053986 | A1 * | 12/2001 | Dick | 705/3 |
| 2002/0004727 | A1 * | 1/2002 | Knaus et al. | 705/3 |
| 2002/0013519 | A1 * | 1/2002 | Adams et al. | 600/300 |
| 2002/0013906 | A1 * | 1/2002 | Wallach et al. | 713/185 |
| 2002/0016923 | A1 * | 2/2002 | Knaus et al. | 713/200 |
| 2002/0022975 | A1 * | 2/2002 | Blasingame et al. | 705/3 |
| 2002/0026328 | A1 * | 2/2002 | Westerkamp et al. | 705/2 |
| 2002/0026332 | A1 * | 2/2002 | Snowden et al. | 705/3 |
| 2002/0029157 | A1 * | 3/2002 | Marchosky | 705/3 |
| 2002/0032583 | A1 * | 3/2002 | Joao | 705/2 |
| 2002/0116227 | A1 * | 8/2002 | Dick | 705/3 |
| 2002/0131573 | A1 * | 9/2002 | Berkley et al. | 379/201.01 |
| 2002/0152265 | A1 | 10/2002 | Felman | |
| 2002/0165736 | A1 * | 11/2002 | Tolle et al. | 705/3 |
| 2003/0046114 | A1 * | 3/2003 | Davies et al. | 705/3 |
| 2003/0050803 | A1 * | 3/2003 | Marchosky | 705/3 |
| 2003/0078987 | A1 * | 4/2003 | Serebrennikov | 709/217 |
| 2003/0097451 | A1 * | 5/2003 | Bjorksten et al. | 709/228 |
| 2003/0120608 | A1 * | 6/2003 | Pereyra | 705/64 |
| 2003/0220817 | A1 * | 11/2003 | Larsen et al. | 705/2 |
| 2004/0034550 | A1 * | 2/2004 | Menschik et al. | 705/3 |

(Continued)

*Primary Examiner* — David Garcia Cervetti
(74) *Attorney, Agent, or Firm* — Michael F. Kriger; Kirton McConkie

(57) ABSTRACT

The present invention is directed to a method for creating a database of verified personal information. Information regarding individuals is gathered from one or more sources and stored. Authorized individuals request to view the information over a wide area computer network. The authorized individuals are allowed to review selected portions of the gathered information which is presented over the wide area computer network. Commentary from the authorized users on the accuracy of said the information is solicited and included in the database with information. Third parties do not have access to the database of verified personal information but can verify information outside of the database.

19 Claims, 13 Drawing Sheets

U.S. PATENT DOCUMENTS

| | | |
|---|---|---|
| 2004/0064343 A1* | 4/2004 | Korpman et al. .................. 705/2 |
| 2004/0103000 A1* | 5/2004 | Owurowa et al. .................. 705/2 |
| 2004/0111622 A1* | 6/2004 | Schoenberg .................. 713/182 |
| 2004/0117215 A1* | 6/2004 | Marchosky ........................ 705/3 |
| 2004/0117376 A1* | 6/2004 | Lavin et al. ..................... 707/10 |
| 2004/0139025 A1* | 7/2004 | Coleman .......................... 705/51 |
| 2004/0193448 A1* | 9/2004 | Woodbridge et al. .............. 705/2 |
| 2005/0027995 A1* | 2/2005 | Menschik et al. ............ 713/193 |
| 2006/0020622 A1* | 1/2006 | Shelton ......................... 707/102 |

* cited by examiner

VERIFIED PERSONAL INFORMATION DATABASE

RELATED APPLICATIONS

This application claims priority to U.S. Provisional Patent Application Ser. No. 60/433,356 filed Mar. 11, 2003, entitled VERIFIED PERSONAL INFORMATION DATABASE.

BACKGROUND

1. Field of the Invention

The present invention relates to a method for gathering, organizing, and delivering personal information over the Internet. More specifically, the present invention provides for a system for electronic retrieval, storage, management, and authorized distribution of personal and confidential, information that is verified as being accurate.

2. Relevant Art

The Internet is a powerful publication and information tool. When a web site operator posts information on a web site, he in effect publishes that information throughout the world instantaneously. Using search engines and location tools, other Internet users can search out posted information quickly and inexpensively. Much of the information shared on the Internet is in the public domain. However, information that is private, sensitive, or confidential is also easily distributed, published, and eventually discovered by others on the Internet. Often this information is published on the Internet without the consent of or concern for the individuals about whom the information is published. Concerns over privacy have led to current national and international discussions about how personal information distributed over the Internet can encroach upon an individual's privacy. Not surprisingly, in an effort to stave off governmental regulation of the Internet, the Internet industry itself has attempted to establish standards for self-regulation with regard to privacy issues.

In addition to the privacy concerns raised by the Internet, because publishing information on the Internet is so easy, the ease and breadth of Internet publication raises concerns about the reliability of information published on the web. The sheer amount of information available on the Internet leaves much of that information suspect as to its accuracy. Documents that otherwise would get very limited circulation, if any, are published globally on the Internet. Similarly, documents and data that are outdated and would have been discarded so as to not waste space remain accessible for years on the Internet. In some cases it is difficult to tell whether information on the Internet is days old or years old. Because there is relatively little cost in maintaining electronic documents and because there is virtually limitless space in which to store things, out-of-date records can remain available for viewing indefinitely. In some instances it is difficult to discern whether the source of Internet published information is a reliable source. Thousands of new websites are created every day. Moreover, many web sites are vulnerable to being modified (hacked into) without the publisher's consent. It is possible for information offered on an insecure web site by a reputable Internet publisher to be altered.

The interactive nature of the Internet makes it risky to store, manage, and transfer personal and/or confidential information on the Internet. As information and data travel along the Internet, multiple copies of the information are made, such as in cache files. These copies may not be secure. Furthermore, much of the private and personal information about individuals posted on the Internet is done so without the knowledge of those individuals. Information such as names, Social Security numbers, phone numbers, contact information for relatives and friends, and even financial account numbers have been placed on unsecured databases, available to the public over the Internet. Attention has recently been drawn to criminals who use personal information obtained on the Internet to defraud, harass, and stalk other people.

Given these difficulties, it would, therefore, be advantageous to provide a method for delivering personal information over the Internet that gathers, stores, manages, and transfers personal and/or confidential information. It would also be an advantage to provide a system that published and distributes such information only with the authorization of a person who is the subject of the information. It would be an additional advantage to provide verified information, preferably having the information verified by the person. It would also be advantageous to provide a secure database that prevents unauthorized access to secure personal information, but allows access to authorized users. It would further be an advantage to create a database of personal information about individuals presently available to the public over the Internet. When a database user searches for or obtains information regarding a particular individual, it would also be beneficial to notify the individual that information regarding him or her is being sought.

BRIEF SUMMARY AND OBJECTS OF THE INVENTION

It is an object of one embodiment of the present invention to provide a method for delivering personal information over the Internet that gives individuals a measure of control over the information that is delivered or retrieved. Specifically the present invention gathers large amounts of information regarding an individual that has been published on other web sites. The information, once gathered, is stored in a database accessible over the Internet through a web site. The person who is the subject of the information may log on to the web site to review, verify, or otherwise modify the collected information. After a person has verified his or her information, when additional information about the person is gathered or when another individual searches the person's database record, the person is notified and informed what kind of information has been found, and who is searching for information and their intentions.

It is another object of at least one embodiment of the present invention to provide reliable information regarding an individual by searching the Internet for information about the individual, gathering and publishing the information in a database available over the Internet, and updating and verifying the information provided.

It is also an object of the present invention to facilitate the requesting and receiving of personal information over the Internet while maintaining this improved reliability of the information and maintaining a measure of control.

It is an object of at least one embodiment of the present invention to provide a method for delivering personal information over the Internet that provides a database populated with information about individuals that has been gathered from other web sites and databases on the Internet.

It is an object of one embodiment of the present invention to provide a method for delivering personal information over the Internet that provides a database with information regarding individuals wherein the accuracy of the information has been verified by the individuals.

It is an object of one embodiment of the present invention to provide a method for delivering personal information over the Internet that provides a secure database for confidential or personal information that is made selectively available.

It is an object of one embodiment of the present invention to provide a method for delivering personal information over the Internet that facilitates obtaining records from external sources where the information relates to individuals included in a database available over the Internet.

It is an object of one embodiment of the present invention to provide a method for delivering personal information stored in a database, over the Internet that notifies a first person when a second person searches for information about that first person on the database.

It is an object of one embodiment of the present invention to provide a method for delivering personal information over the Internet that notifies a person when additional information about that person is found on the Internet.

It is an object of one embodiment of the present invention to provide a method for delivering personal information over the Internet that allows the user to electronically request information available from external sources, that is, information not in the database.

It is an object of one embodiment of the present invention to provide a method for delivering personal information over the Internet that allows a person to electronically authorize the release of confidential records.

It is an object of one embodiment of the present invention to provide a method for delivering personal information over the Internet that allows a the party to electronically deliver confidential and/or personal information from an external source.

The present invention is a method for providing information over the Internet by creating a database populated with information that has been gathered from various sources over the Internet or otherwise obtained and put into a database format. One of the advantages of gathering information from the Internet as opposed to other sources is that the Internet can be searched automatically such as by using software "robots." These programs, referred to as "webcrawlers," "spiders," and "web robots" can automatically search documents or web sites and extract and retrieve information from the documents on the web sites. The information can then be transmitted to a database and the data be used to populate the database.

Once the information is stored in a database, the database can be made available over a computer network, such as the Internet. The database may be made available over a wide area network or local area network. There are three groups of users of the database: there are the general public, database members, and database subscribers. Users of the database, in this sense, are persons or entities who require access to the database information. In one embodiment, when the database is operational, the public has access to some of the information that is initially gathered by the Web crawlers and related sources. This freely shared information is provided on a publicly available database over the Internet, preferably the World Wide Web, and the more personal verified information is available on a secure database through a subscription. Individuals wishing to search the public database will access the database through a browser interface and will be granted access after registering with the database service.

Other persons or entities are be granted access to the verified information, that is, the information taken from the public database and subsequently verified for accuracy. The information in both the public database and the secure, verified information database is made available to subscribers to the database service. In other words, in order to gain access to the verified database, the user must subscribe to the service. Subscribers to the service will also be able to view the source of the information provided in the public database. For example when a subscriber views information about an organization to which a member belongs, the web site or database or publication from which that information was taken is displayed in conjunction with the information. Additionally, subscribers can make special requests for information. For example a subscriber may request access to confidential information about a member that was previously provided voluntarily to the database service by a member. The subscriber may also request additional information from proprietary and other external sources through the database service or may ask for additional confidential information from external sources working through the database service.

In addition to the general public and subscribers, database members will be provided with access to the database in order to allow them to verify the information about them in the database. In order to become a database member, a person must register and will preferably have a means of authenticating his or her identity.

Given that much of the information retrieved and stored in the database, whether retrieved automatically or otherwise, may be out of date or otherwise inaccurate, individuals wishing to correct the information can register as members of the database and granted access to verify the accuracy of the information and to learn the source of the information. The verified information together with the sources of the information are stored in a secure part of the database or in an entirely different the database. As information continues to be provided by the web crawlers, the database is updated and the new information subsequently verified by the member.

Each member will be provided with access to his or her information in the database as well as access to view the source of that information. Members will not be granted access to other's information unless they also choose to subscribe to the service. Naturally, a member may become the subscriber if desired, and thereby gain access to the entire verified database. In one embodiment of the present invention the member is able to volunteer additional information and add confidential information to the database. The member is also provided with the means to authorize or deny a subscriber's request for the additional information or the confidential information.

The present invention also provides the member timely notification of database search activity related to the member. The member will receive an electronic alert, such as an e-mail, when information about the member is accessed or requested. In one embodiment, the member receives information regarding which users are searching for information about the member and the database service also provides the member with the information as to why the subscriber was searching. Similarly, when new information is discovered on the Web and/or is added to the public database, the member is electronically notified about the new information. The member will also be notified when a subscriber makes a request for authorization for confidential or personal information from the database or external sources.

In order to maintain an appropriate level of privacy, the information in the database that is transmitted to and from various users and the database service may be encrypted or sent over secure connections, as necessary.

DETAILED DESCRIPTION OF THE PREFERRED EMBODIMENTS

Figure 1:
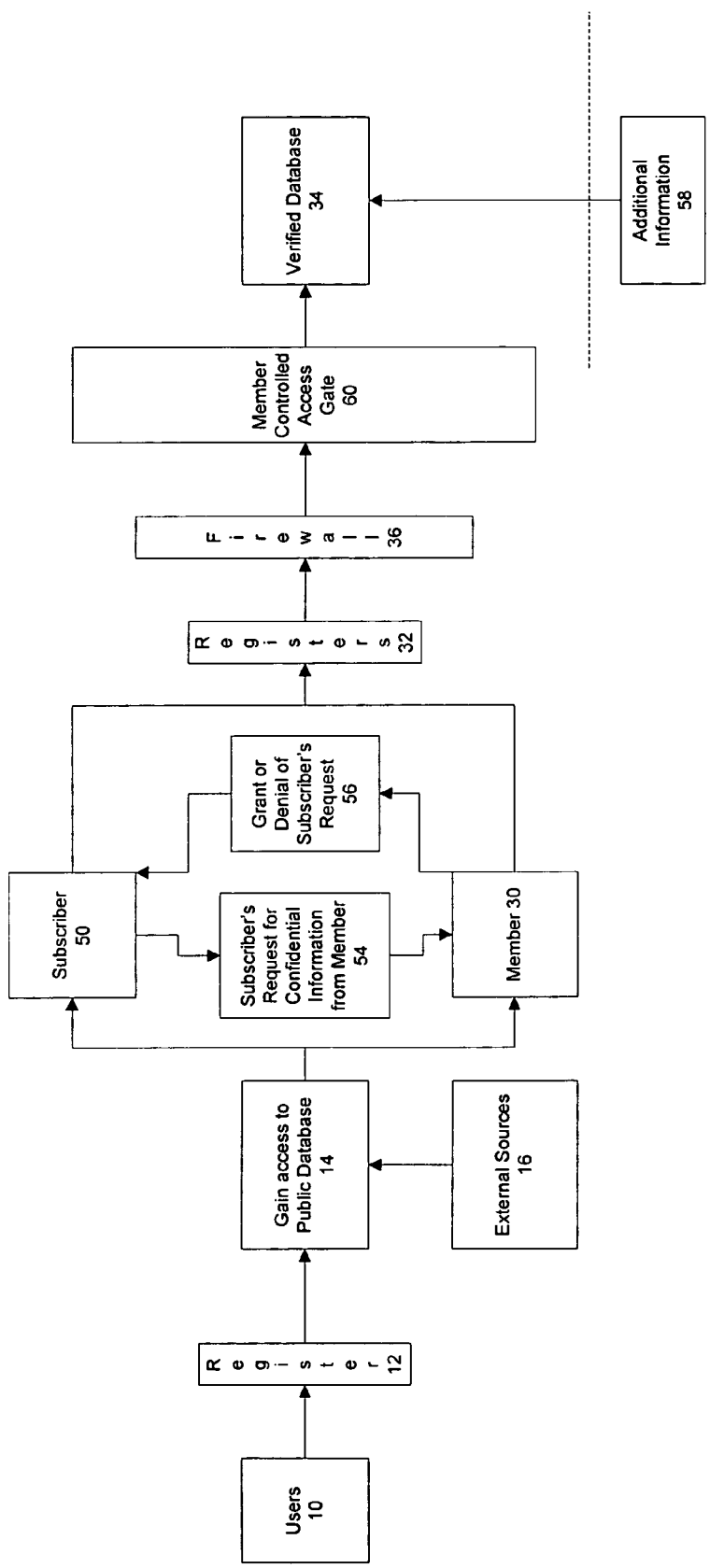
FIG. 1 shows a flow chart of the embodiment of the method for providing personal information.

One of the great advantages of the present invention is its ability to continuously gather personal information and update the database. Information for the database service is gathered from both Internet sources and non-Internet sources. These sources include but are not limited to government, business, public records, the media, publications, and educational, religious, and other organizations. The sources are not necessarily limited to sources where information is provided for free. The present invention contemplates incorporating proprietary databases and other subscription or private databases, as is practical. In one preferred embodiment of the present invention, information is gathered automatically using web crawler programs and other Internet location tools. Because Web robots or web crawlers are able to move through the Internet by retrieving a first document and retrieving subsequent documents referenced in the hypertext of the first document, the Web robots can efficiently and automatically gather information. Recognizing the efficiency with which the Internet can be searched for relevant data, information available on the Internet remains a preferred source for gathering data.

The information gathered automatically or otherwise is entered into the database. The database of the present invention is not limited to any particular data model, however, the database design facilitates data extraction and allows for efficient and economical storage of the data, relatively easy modification of the data, and allows for ongoing expansion of the database. In the preferred embodiment of the present invention, the database uses a relational database model. More specifically, a client/server database is provided and populated with the gathered information. The client/server database is preferably capable of continuous operation and is able to handle multiple requests. The client/server database should be accessible via a command line interface and/the database should be secure and facilitate concurrent control. Application interface programming (middleware) permits the database to communicate with the server. The application interface programming may be any programming known in the art, for example, Common Gateway Interface (CGI) scripts. Other software applications that facilitate the interface between the server and the database application, such as a DBI module, may also be employed in the present invention.

Access to the client/server database, can be achieved by plugging directly into the database (using a command shell) or through a network socket. Any appropriate database language known in the art can be used with the database of the present invention. It is beneficial for the language to be standardized and capable of performing in the cross-platform environments. In a preferred embodiment, the user access is obtained through a network socket connection allowing remote access to the database by multiple users and the database operates using structured query language (SQL).

The present invention is designed to provide information to three types of users. The first level of users is the public. The information that is gathered into the database by the web crawlers and by other means is made available to the public at large over the Internet. This information is labeled the "public database." In one embodiment, the public database comprises all of the unverified information. In another embodiment, the source of the information in the public database is withheld. In a third embodiment, only an index of names contained in the database is publicly available. In order to access the public database, the public user must register and submit information to the database service. The registration information should be sufficient to uniquely identify the individual and may include providing information such as name, address, e-mail, and phone number. In the registration process, the user may be required to consent to use of the registration information within the database itself. Thus, as a result of the public's use of the public database to locate personal information about others, the value of the database increases with each new user. The public database is intended to function as a read-only database.

It is anticipated that most individuals whose names are listed in the database will benefit in some way from discovering how much information and what information about them is published on the Internet. Just knowing that such information is being distributed or published on the Internet will be of value to some people; however, other people will benefit even more if the accuracy of the information could be ascertained. For example, accurate information about an individual's whereabouts, occupation, and associations could be valuable in business or legal context. This kind of information could be useful to an insurance company, legal professionals, and family historians. The verified database will be available to subscribers.

A subscription to the verified database gives subscribers the access they need to search the entire verified database and specifically to note what information from the public database has been verified by a database member, if any. The subscription service also allows the subscriber to view the source of the information that has been gathered. Knowing the source of the information will help the subscriber in judging the reliability of the data presented by data source. In the preferred embodiment, the subscriber's request for information comes in the form of a query offered through a web page interface. The subscriber uses an Internet browser to log into a particular site, for example, youtakecontrol.com, and using electronic forms provided on the web site, the subscriber can register, and submit a query to the database. The requested information is retrieved from within the database and is then presented to the searcher as a web page on the searcher's browser. The information could alternatively be delivered using other electronic formats such as a e-mail or fax, or hard copies may be delivered up to the subscriber. The registration and query are submitted to the database.

The database service can employ a variety of payment methods for the subscribers' use of the database; for example, the subscriber may be billed for per onetime membership, per use, per query, per time spent in the database, or a combination of these or any number of methods.

Another important benefit of subscription is that using the identifying information in the verified database, the subscriber can request authorization for private and/or other confidential information about a specific member through the database service. The confidential information requested may be stored in a secure part of the database and may only require that the member from whom authorization is being requested, authorize the release of that information. If the member grants the authorization to release the information, the database service can give the subscriber access to the secure information about the member in the database. Preferably, the member uses a process of electronic authorization, such as a digital certificate.

On the other hand, the request for specific information may entail gathering confidential information from one or more external organizations. Without the benefit of the present invention, when the party wishes to obtain confidential information, the party would have to follow some procedure for getting authorization to have the confidential documents released. When the information being gathered is coming from several different sources, the process is even further complicated for the person making the request. Subscribers using the present invention can benefit from the fact that a single request and authorization can serve as the basis for the release of documents from several external sources. Additionally, because the process occurs electronically over the Internet, the speed and ease with which the transaction is carried out is greatly increased. Thus, the process of requesting information from the external organizations can be simplified by making a single request for confidential information to the database service.

In order to verify and modify the database, the member must have access to the database. In the preferred embodiment, the member is able to verify information and add information to his records in the database over the Internet. In the same way the subscriber accesses the site using a browser, the member can also access a web page and be presented with electronic forms that allow the member to register and be authenticated by some process. Preferably the authentication process is either a digital certificate or a biometric process, but other authentication systems such as pin numbers and passwords can be acceptable.

Once the member has registered and is authenticated, the member will have access to information related to him or her. As with a subscriber, the member can select an electronic form on the database service web page, and enter a query for specific information. Not all of the information in the verified database is made available to the member. Specifically, the member will be able to view only the information related to the member presented in the public database and the sources of that information outside the database and any additional information such as personal information made available by the member to the database.

When the member's query is returned, the member is able to interactively verify or deny the accuracy of the information presented. The format for verification may take one of several forms, for example, the member may simply check an open box next to the information as is presented on the web page to indicate that the information is accurate. Alternatively, the member may be presented with the option to actively verify or actively deny the accuracy of the information, such as by inserting a plus sign ("+") to verify or a minus sign ("−") to deny. In another embodiment the member is allowed to actively edit the information. When the information is edited by the member, preferably the database reflects that the information presented has been edited.

Another unique feature of the present invention is that members receive electronic notification of activity relating to their information in the database. When a user in the public database or the verified database requests information about a member or conducts research in the database that results in information about the member being displayed, the member will automatically receive electronic notification of the activity. The member may receive notification of the user's registration information and the query that was used. Additionally, information concerning the purpose frequency and time frame of the user's research as well as other relevant factors can be provided to the member in the electronic notification.

It is anticipated that information within the database will be supplemented by a continuous gathering process such as may be conducted by web crawlers. Furthermore, data originally gathered and included initially in the database from an external web site could subsequently be modified, and therefore need to be updated in the database. As new information about a member in the database is discovered, and as old information is updated, the member will receive electronic notification of the new material in the database and will therefore be given an opportunity to the verify the accuracy of the new information.

The preferred embodiment of the present invention helps to maintain the confidentiality of information by encrypting confidential information during storage and/or transmission. Likewise, to protect the commercial investment of the database service and to help maintain privacy, the database management system of the present invention provides for security measures. The present invention preferably does not allow the user's direct access to the data stored.

FIG. 1 shows a flow chart of one embodiment of the present invention. Users 10 register 12 in order to gain access to a public database 14. Information for public database 14 is supplied by external sources 16, such as the Internet or government entities. Member 30 registers 32 to gain access to a verified database 34, which can include medical records, financial records, academic records and any other personal records. All members must register and be authenticated via digital certificates. A firewall 36 prevents a public user from gaining access to secure information in verified database 34. Member 30 only has access to information regarding member 30.

A subscriber 50 also registers 32 in order to gain access to the verified database 34. Additionally, subscriber 50 can request confidential information 54 regarding the member 30. Member 30 is notified of this request and may grant or deny subscriber's request 56 for the confidential information 54. Additional information 58 may be maintained in a secure area of database 34 or may be an external source of information from verified database 34. Authorization by member 30 may be a preauthorization, standing authorization or an authorization following the request. Upon receiving authorization, member controlled access gate 60 allows subscriber's 50 request to be retrieved from the confidential information 54.

Figure 2:
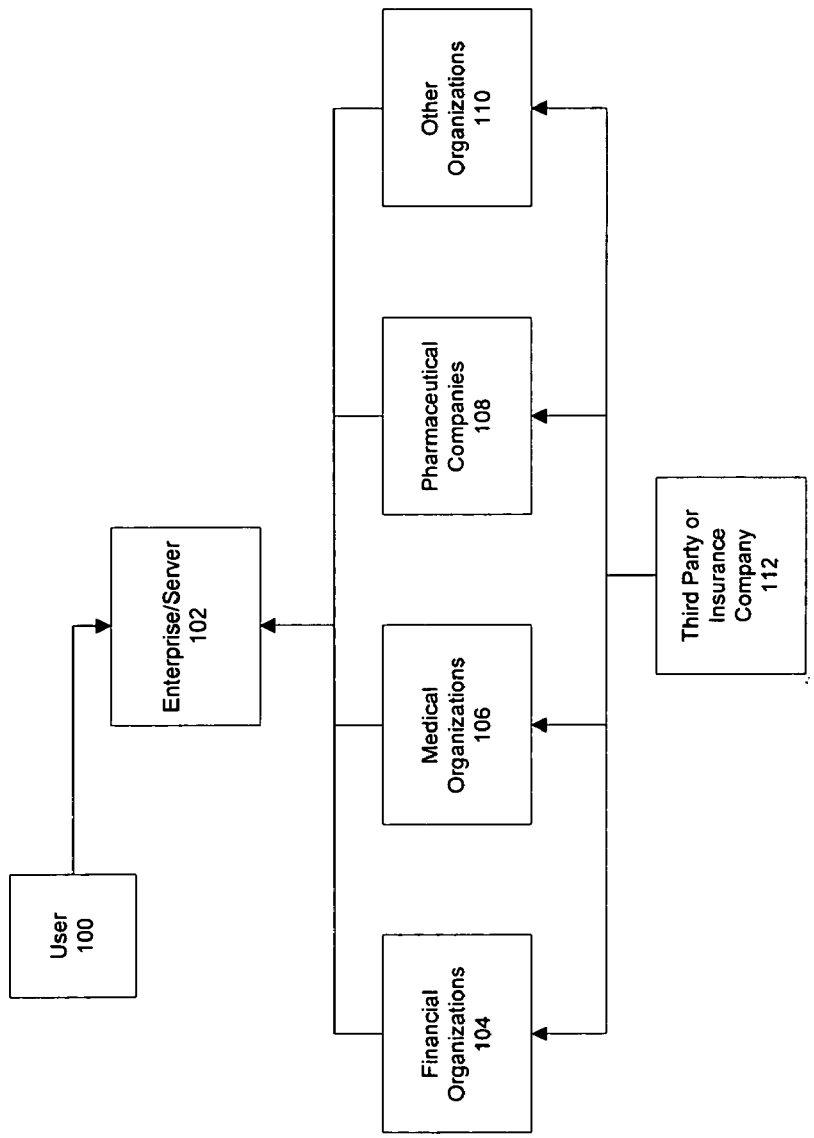
FIG. 2 shows a flow chart of the embodiment of the method for providing personal information.
Figure 3:
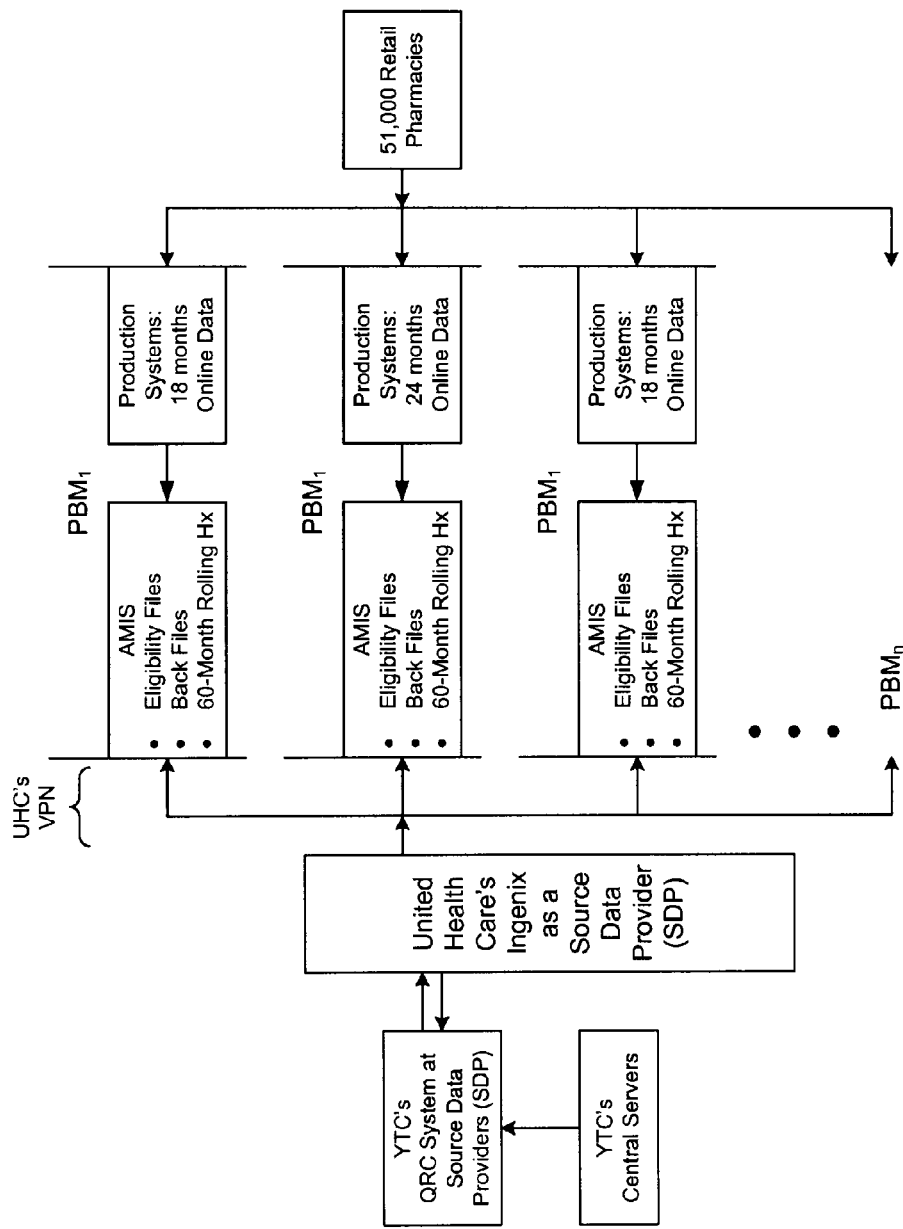
FIG. 3 shows an example of a source data provider (SDP) collaborating with a database service to enable members of the database service to be automatically alerted concerning revenue-generating opportunities while retaining their anonymity.

FIG. 2 shows a flow chart of another embodiment of the present invention. In this embodiment, a user 100 enters into a relationship with an enterprise/server 102 using the software described herein. User 100 gives enterprise/server 102 confidential information and also discloses to enterprise/server 102 which financial organizations 104, medical organizations 106, pharmaceutical companies 108 and other organizations 110, hold confidential information about user 100. Enterprise/server 102 then contacts each of the organizations specified by user 100 and each organization contractually agrees to first contact enterprise/server 102 before releasing any information about user 100 to any third party 112. If third party 112, such as an insurance company, contacts one of the organizations that has personal information about user 100, that organization must first contact enterprise/server 102 before releasing such information. Enterprise/server 102 then contacts user 100 and if user 100 gives enterprise/server 102 authorization, enterprise/server 102 then instructs the organization to release the information to the third party 112.

An example of one embodiment of the present invention is provided below. The example is merely illustrative and is not limiting of the present invention in any way.

EXAMPLE 1

In this example, a user that logs onto the Internet using a standard browser is directed toward an interactive web site that acts as a portal to the database. The web site includes an explanation of how the database may be accessed and also gives options that allow people to log onto the database to gain access to various types of material. For example the web site may present hypertext links that allow database members, database subscribers, and the general public to log on and retrieve particular kinds of information from the database. In this example, if the user selects the option to use the publicly available records, the user clicks on the "public" hypertext link which directs the browser to another web page where the user is required to register before accessing any publically available information. This registration web page may require the user to submit its e-mail account, identify the general purpose of the search, and provide other information useful to the administrators of the database. The public user submits the required registration information and is then directed to another web page offering the options of the types of information available to the public from the database.

The types of information made available to the public can vary. In this example, indexes of the types of information found in the database are available. For example, an index including the various categories of information in the database, an index of individual names in the database, an index of verified names in the database, an index of sources or types of sources employed in compiling the database, and an index of various inclusion categories may be available for public searching. The information made available to the public in this example is intentionally limited and is intended only to provide the public with a general idea of the scope and range of the database.

The user of the public database may select from among the various options available for searching, such as an index of verified names, and can enter a search query in a query box made available on the index search page. Alternatively, the public user may elect to browse the indexes at random in order to better ascertain the scope of the database. After the user enters the desired query and has indicated the desired index to be searched, the search query is submitted and the information is transferred from the web site server to the database where a search engine retrieves the relevant information from the database. The results of the search are presented to the user as a citation list on the web page. The user can print the cite list, download it, or otherwise have the list electronically mailed, transferred, or faxed to a desired location. The user is also presented with the options of exiting the web site, subscribing to the database or joining as a database member.

If the user wishes to become a member of database, the user may activate the hypertext "membership" link, which when activated directs the browser to the membership application web page. The application page requires that the person requesting membership or what the supply personal information, provide a means for identification and authentication, and pay a fee. The application screen prompts the user to enter personal and contact information that will identify the user and grant the user membership access to the database. The personal information requested may include first and last name, e-mail address, phone, fax number, and other contact information.

After the user has entered the personal information, the screen prompts the user to input a means for identification and authentication. The means for identification and authentication include, but are not limited to, passwords, personal identification number, digital certificates, and biometric identification methods. The user may be prompted to enter and confirm a password or personal identification number. Where technology permits, the user may use the computer to scan fingerprints or use some other biometric form of identification. The identification and authentication means provide access security to the verified information about the member, allow the member to alter or validate information, and may subsequently serve as evidence of the member's consent to the database modification.

After the user has submitted information identifying and authenticating the user as a member, user is prompted by the screen to pay the membership fee. The screen displays several options for making a payment electronically, for example, a user may make a payment using an accepted credit card, electronic credit transfer, such as Pay Pal, electronic transfer funds or other means for transferring funds electronically known in the art. The access to the database as a member is not granted until payment is received and/or verified. Payment is sent over secure lines and when it is received by the account holder for the database, notification of the received payment is sent to both the member and the database administrator. The user receives an electronic confirmation of the payment through the selected communication means and is also notified on the screen that the payment has been sent or received.

Having received confirmation of the payment, the user is prompted or allowed to exit the program or to enter the database by selecting or clicking on hypertext links. The user selects the option to view the information from the database that is presumably related to the user, now member. An automatic search is run to generate a citation list using the information provided by the member in his application. The citation list shows all the information specifically relating to the member that has been collected by the Web crawler programs and entered into the database and shows the source from which that information was obtained. The citation list presents only an abbreviated form of the information available related to the citation. Each citation contains a hypertext links to a full text presentation of the information gathered from a particular source. The user can activate the hypertext links by clicking on the text.

The user is allowed to search through and verify the citation list. Next to each citation are three boxes that can be alternately "checked" by clicking on the box with the mouse. One box when checked indicates that the information in the citation is correctly associated with the member and not with another person with a similar name or similar information and indicates the information has been verified as correct. The second box when checked indicates that the citation refers to the member but that the information is not verified as correct or is incorrect. The third box when checked indicates that information gathered is not related to the member. The user can review the citations, and by checking one of three boxes indicate what information is relevant to the member.

Information that is verified by the member as referring to the member and being correct is saved in the database as verified information, information that is checked as being as referring to the member but being incorrect is saved in the database as information that is not verified as correct. After checking the boxes of the citations, the unverified list is presented on the screen. The member is then prompted to review the unverified list in order to determine if the member wishes to contact the sources from which the information was gathered in order to correct the information. By clicking on hypertext links in each citation, the user receives contact information and instructions on how the information can be corrected. The database administrator may also offer a service whereby the database administrator contacts the source of the information to have information corrected and in some cases removed from the source.

The member may then be prompted to voluntarily submit additional information, if the member so desires. The additional information may be requested to supplement the information in the verified list. The additional information requested may include personal information, name, address, and the Social Security number, the birthrate, birthplace, height, eye color, weight, and other types of information. The types of information include but are not limited to medical information, academic information, consumer and financial information, social and political information, groups or associations with which the person is affiliated, and other types of information. The additional information also includes information that corrects or explains any incorrect information discovered by a member searching through the citation list. The member may choose to have this information made available as part of the verified list of information made available to all subscribers to the database, or may choose to selectively withhold the information, allowing information to be released only upon specific authorization by the member.

After submitting the results of the citation list review, and providing the additional information, if any, the member is prompted to view the verified information and additional information and confirm its accuracy. The accuracy may be confirmed by employing a means of identification and authentication, such as the electronic signature or biometric identification methods discussed above. The verified information is saved in the database shown on the citation list as verified and authenticated data regarding that specific member.

When the member has completed verifying and authenticating the information about himself/herself in the database, the member is prompted by the screen to choose whether or not to participate in database inclusion programs. The inclusion programs allow the database to release certain types of information to groups performing research, studies, or demographic profiling. For example the inclusion programs would allow the release of medical related information from the database to a research group performing a study. The inclusion program may allow the researcher to contact the member to participate in a study, trial, or test. Other types of profiling or demographic studies could include marketing research, social and political research, and scientific and other types of statistical studies. The user is presented with a list of categories of types of inclusion programs. Below each category of inclusion programs is a list of specific inclusion programs related to that category that are presently being conducted, or will be conducted using the database.

By clicking on a hypertext link, the user can get details about the study and explains what information would be gathered. Next to each category heading and next to each specific inclusion programs listed is an empty box which the user can check by clicking on the box with a mouse. By checking the boxes, the user can select the types of inclusion programs in which the user wishes to participate. By submitting to participate in a program, the user allows personal information relevant to the particular study to be released. The information released includes only the information identified in the explanation and does not include information that would specifically identify the individual. The user may also authorize the release of external records or other confidential information related to particular kinds of studies using the method for authorizing the release of external records outline above and described in greater detail below.

In this embodiment of the present invention, the member is allowed to choose whether or not he wishes to authorize the release of personal records and confidential information maintained in the database or maintained by some third party or external source. In order to allow the member to make the electronic authorizations through the database service, the member is prompted to select the authorization service by clicking on a hypertext link. The member is then presented with a web page offering several types of authorization services. The member may choose to pre-authorize the release of certain types of information, to grant standing authorization to release information, or to indicate a willingness to review requests for authorization to release his personal information.

The member selects the option to preauthorize the release of certain information by clicking a hypertext link that presents the member with an electronic form that the member fills out. On the form, the member identifies certain specific organizations or the entities that are authorized to receive the personal information for a specific purpose and for a limited time. In this example, the member may indicate a desire to release academic transcripts to several colleges as part of an admissions process. The member enters the name of each college or university for which preauthorization is granted on the electronic form and places a limit on the scope of information to be granted, specifically listing the types of information that will be released to university. The member enters the date on which the preauthorization will be terminated. The member formalizes the preauthorization using one of the identification and authorization techniques explained above, such as biometric authentication.

The information in the electronic form is then saved and transmitted to the database service where it is stored and maintained until a request from one of the specified organizations is received. When the request for information is received, the material is released to the organization based upon the member's preauthorization. The preauthorization may be automatically deleted from the system when the deadline terminating the authorization is reached.

The member is also prompted to select whether or not he wishes to grant standing authorization for the release of certain information to specific entities or organizations. Clicking on the hypertext link, the member is presented with an electronic form that the member fills out. On the form, the member identifies certain specific organizations or the entities that are given standing authorization to receive the personal information for a specific purpose and for a limited to the time.

The member may give standing authorization for the release of medical records to health-care professionals and specifically to emergency response units. The member may designate information such as medical history, prescribed medications, allergies and other important medical information that may be a benefit to health-care workers treating the member. Similarly, certain information may be made available to the member's attorney with a member is incapacitated or dies, based upon a standing authorization, conditional upon an event. The information in the electronic form is then saved and transmitted to the database service whether it is stored and maintained until a request is received.

The member is also prompted to indicate whether the member is willing to receive the third party requests for authorization for the release of records. The member indicates his willingness to do so by checking a box so labeled. If the member is willing to receive authorization requests, when the third party requests release of the information, and the third party is not otherwise authorized, the database service will deny the third party access to the information but will indicate that the member is willing to receive a specific request. The third party can then elect to have such the request sent through the database service to the member, and the member can grant or deny the request.

EXAMPLE 2

Employing the same embodiment of the present invention as described in example one, a different user logs on to the web site to gain access to the database service. The user selects the option to use the publicly available records, and clicks on the "public" hypertext link which directs the browser to the web page where the user is required to register before accessing publically available information. This registration web page requires the user to give an e-mail account, identify the general purpose of the search and provide other information useful to the administrators of the database. Having provided the required registration material, the user submits the information and is directed toward the web page offering the options of the types of information available to the public from the database.

After reviewing the types of information available to public database, the user determines to subscribe to the database and clicks on the "subscription" hypertext link. Upon activating the hypertext link, the user is directed to a subscription application web page. The subscription to the database service requires the user to pay a fee and fill out an informational subscription form. The fee may be paid over the Internet using a credit card or some other form of electronic payment. The painted information can be gathered, transmitted and electronically processed using methods known in the art. Once the payment is processed electronically, the user's browser is directed to a subscription form web page.

The subscription form requires the subscriber to give identity of the subscriber, the nature of the subscriber's use, whether personal, business or some other purpose, and to provide contact information such as email address, address, phone etc. The information is submitted by the new subscriber to the database service where the information is stored and assigned a number unique to the subscriber. The subscriber is then prompted to enter an access password to be associated with the assigned subscriber number. Having entered and confirmed the password, the subscriber is now permitted to log onto and search the database. By activating a hypertext "log-on" link, the user is directed to the subscriber's log-on web page.

On the subscriber log-on page, the user is prompted to enter the subscriber number and password. Once the subscriber has transmitted the subscriber number and password to the database, and the identification number subscriber number and password are verified, the user is directed toward the search engine web page of the database service. The search engine web page allows the subscriber to conduct a database search over the Internet.

The database search is accomplished using a standard search engine program appropriate for retrieving information from the database. However, unlike most search engines, in addition to entering the search terms into the search engine, the database also requires and prompts the subscriber to indicate the nature or purpose of the search. After the subscriber has conducted a search, the information regarding the nature of the search can subsequently be provided to any members of the database whose information is accessed during the subscriber search. Thus the user enters both the nature of the search and the search terms and submits them. The search engine may have numerous options for searching the database, such as allowing selective searching of categories of information, providing various restrictions on the search such as geographic or data restrictions, and permitting the use of boolean word searches and other features typical of search engines.

In this example, the subscriber searches for an information regarding an individual. The user enters the person's name and the person's date of birth into the search engine query and submits the search. Other types of information that the user could submit as part of the search for the individual include but are not limited to the person's address, place of birth, age, occupation and spouse. Matching search results from the database are posted on a results screen and presented to subscriber. The results screen shows the results in an abbreviated form, each relevant entry containing a hypertext link which, when activated, provides a more complete view of the member information. The subscriber can then choose to print, save or deliver all or selected results from the search. The results can be saved directly to the computer the subscriber is using, or can be e-mailed or faxed to various locations as desired.

If the subscriber wishes to obtain information that requires the member's authorization, the subscriber may attempt to obtain information through the database service. For example, the subscriber may click on a particular member's record having a hypertext link indicating that medical records are available, if authorized. When the subscriber clicks on the medical records hypertext link, if the subscriber is authorized to receive the member's records, then the medical records available on the database are presented to the subscriber. If the subscriber is not to authorized to receive the medical records, the subscriber may request such authorization from the member, if the member has indicated willingness to receive such requests.

In some situations, the database is made available to special subscribers who obtain information directly from the database service, rather than over the Internet. For example, organizations participating in statistical researcher or demographic profiling may be granted access to the database directly from the database service, or the database service may gather and offer the information directly to these organizations.

EXAMPLE 3

A Scenario for Understanding Membership Marketing and Revenue Opportunities

Sutter Health is a network of doctors and not-for-profit hospitals serving more than 100 Northern California communities. In its monthly newsletter to its patients, Sutter includes a very positive, very informative story about You Take Control and the benefits of YTC membership. The story concludes with a recommendation that readers go to Sutter's website and follow the link to You Take Control.

When Sutter's patients follow the link to the YTC homepage, they will see—prominently displayed—an icon labeled "Free Membership." When the user clicks that icon, they will be greeted with a list of 20 sponsors, each offering to pay the cost of an individual YTC membership in exchange for the user answering ten questions. In this case, the Sutter patient chooses Pfizer and answers the ten questions posed by this large pharmaceutical company.

At this juncture, Pfizer pays YTC $9.95. Of this, a percentage is paid to Sutter for recruiting a subscriber—the first payment type that it will receive for this individual—as evidenced by the new member having clicked through to the YTC site from the Sutter site. Sutter has realized a win-win: it has helped one of its members and it has initiated a new revenue stream for itself.

One of the ten questions that Pfizer asked the person to answer had to do with a new prescription medication the company is marketing. Because this person indicated in her answer that she is, in fact, taking this medication, the YTC screen she is now presented with asks "as one of the persons taking this new medication, would you consider, for a fee, answering our monthly follow-up questionnaire?" This is known as a "post-surveillance" study questionnaire, and in this case the new YTC member answers "yes" to the question of her willingness to participate. She is now shown a screen that tells her that, now that she has elected to participate, Pfizer, through YTC, needs to verify that she has indeed been prescribed this medication and is taking it on a continuing basis. She is told that she will remain anonymous to Pfizer, that YTC will handle the process. She is asked to indicate her permission for this verification to take place, which she does. YTC now verifies with Ingenix/United Healthcare that this new YTC member is taking Pfizer's new drug. And once this verification is completed, a chain of remuneration begins.

Pfizer is willing to pay $1000 per year, per person, for participation in the post-surveillance surveys. Of this, YTC will pay its member $800, meted out in twelve equal payments that are sent to the member after each monthly survey is completed. From YTC, Sutter Health, the recruiter, receives one percent of Pfizer's annual payment, or $10. This sum is also paid by YTC to Ingenix for performing the verification. Therefore, after paying the supporting players, YTC's net income from this process is $180. Pfizer wants 15,000 participants in its post-surveillance study of this new medicine, for which it will pay a total of $1.5 million. YTC's gross proceeds are $300,000, and its net revenue will be in excess of $250,000—all without human intervention.

EXAMPLE 4

Figure 4:
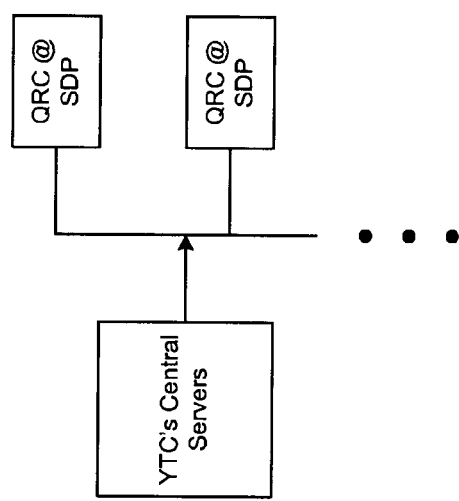
FIGS. 4-6 illustrate steps of SDP collaboration with a database service to enable members of the database service to be automatically alerted concerning revenue-generating opportunities while retaining their anonymity.
Figure 5:
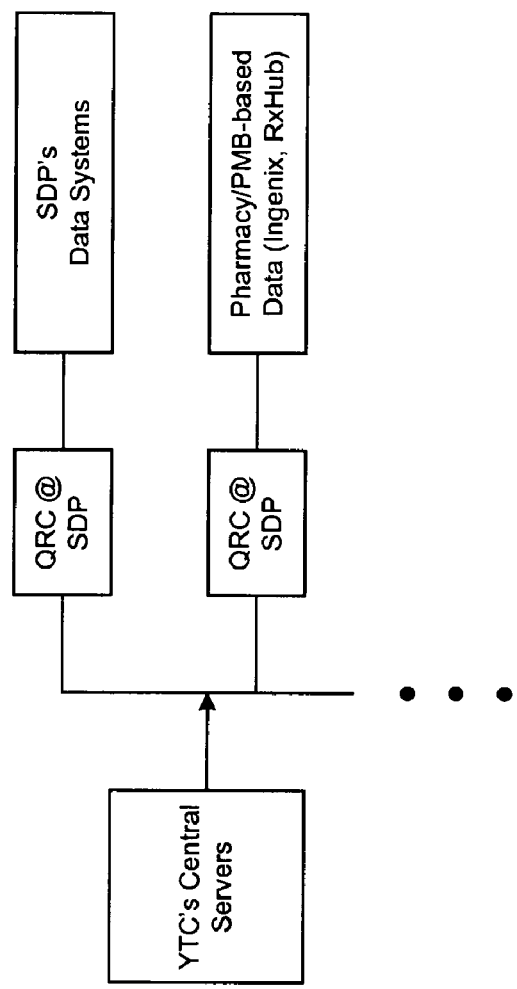
Figure 6:
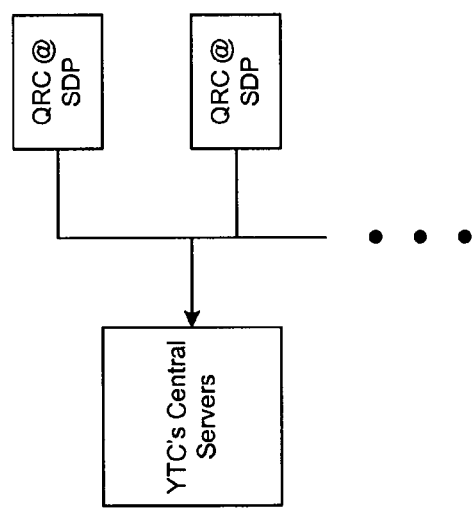

This example illustrates how YTC enables its members to be automatically alerted concerning revenue-generating opportunities that they specifically qualify for while retaining their anonymity. FIG. provides a view of an example of SDPs collaborating with YTC, specifically an example of "Prescription Profile," an SDP, collaborating with YTC. FIGS. 4-6 illustrate features of this process of selective dissemination of information (SDI).

In a first step of the process, YTC members may set a flag in their Profile showing that they want YTC to inform the member concerning revenue-generating opportunities for which they personally qualify (making it easier for YTC's members to learn of such revenue-producing opportunities without their having to constantly search to find such opportunities for themselves). This may occur through YTC's central servers. In a second step, illustrated in FIG. 4, YTC will send only essential information (for only those members who have indicated, via their profile, that they want to be informed by YTC concerning revenue-generating opportunities) to the QRC system at each of the appropriate SDPs to determine if there is a match (this is the process of validating that the member qualifies for the revenue opportunity).

At step three, illustrated in FIG. 5, the QRC at the SDP will then communicate and interact with the SOP's data systems to determine which YTC members actually match the required criteria for the revenue-generating opportunity. At a fourth step illustrated in FIG. 6, the QRC system sends the complete list of all YTC members who have qualified for the revenue-generating opportunity back to YTC's Central Servers, and it records in the audit trail on the QRC all pertinent information for this transaction.

YTC's Central Servers then alert those YTC members who qualify for the revenue-generating opportunity via secure e-malls, and the YTC member has to respond within a specified timeframe to the opportunity. The YTC member receives notification that they have qualified for a revenue-generating opportunity along with all details pertaining to that opportunity, and then the member responds back with an indication of their desire to proceed or to decline the opportunity. The YTC member receives remuneration ($$$, potentially even substantial remuneration) from YTC for their voluntary involvement in the revenue-generating opportunity, all the while maintaining their anonymity—the entity paying YTC to find qualified individuals need not know who the specific individual actually is.

EXAMPLE 5

Figure 7:
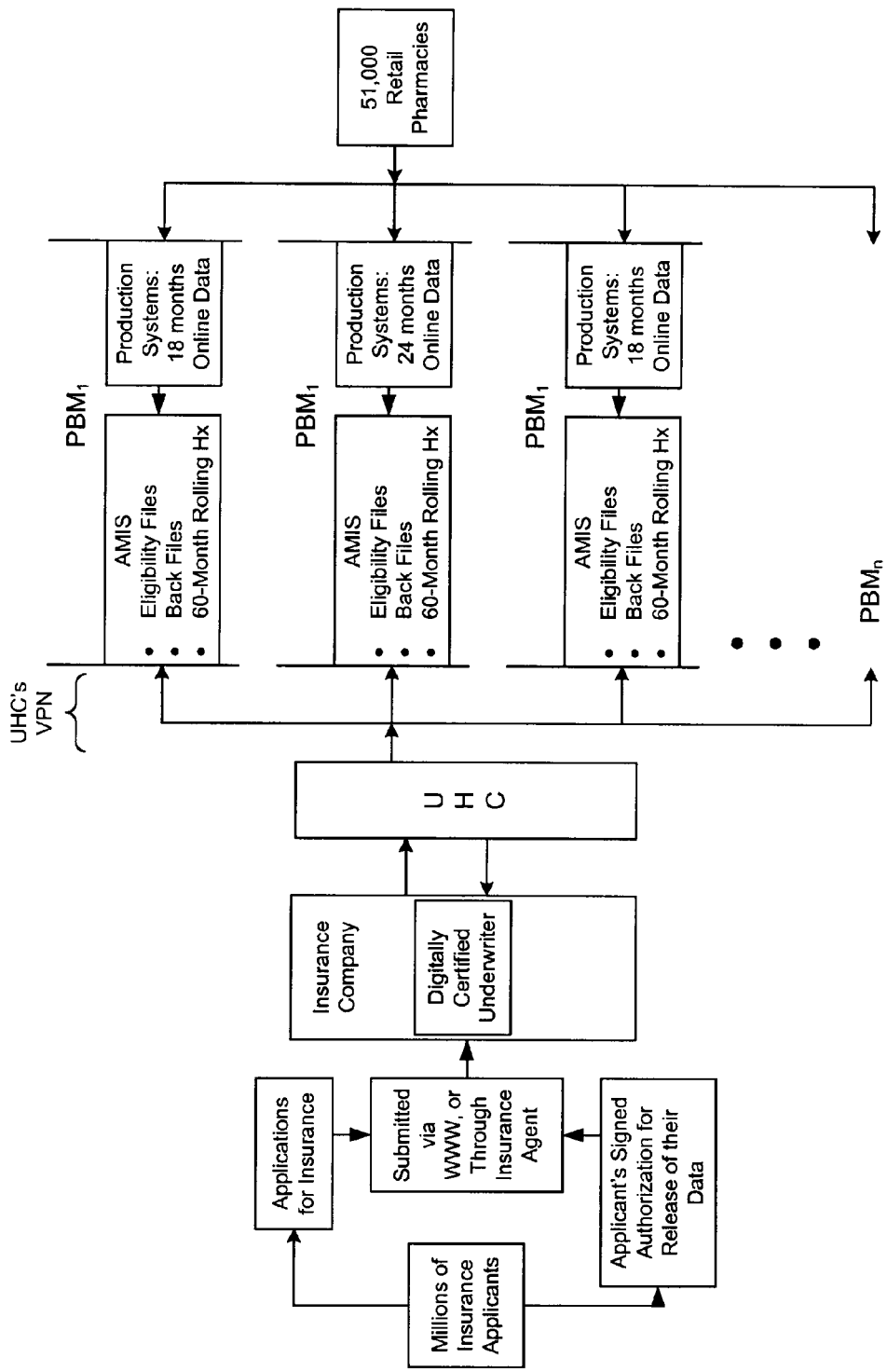
FIGS. 7-11 illustrate an example of SDPs participating in new revenue-generating opportunities while also complying with all privacy laws and regulations.
Figure 8:
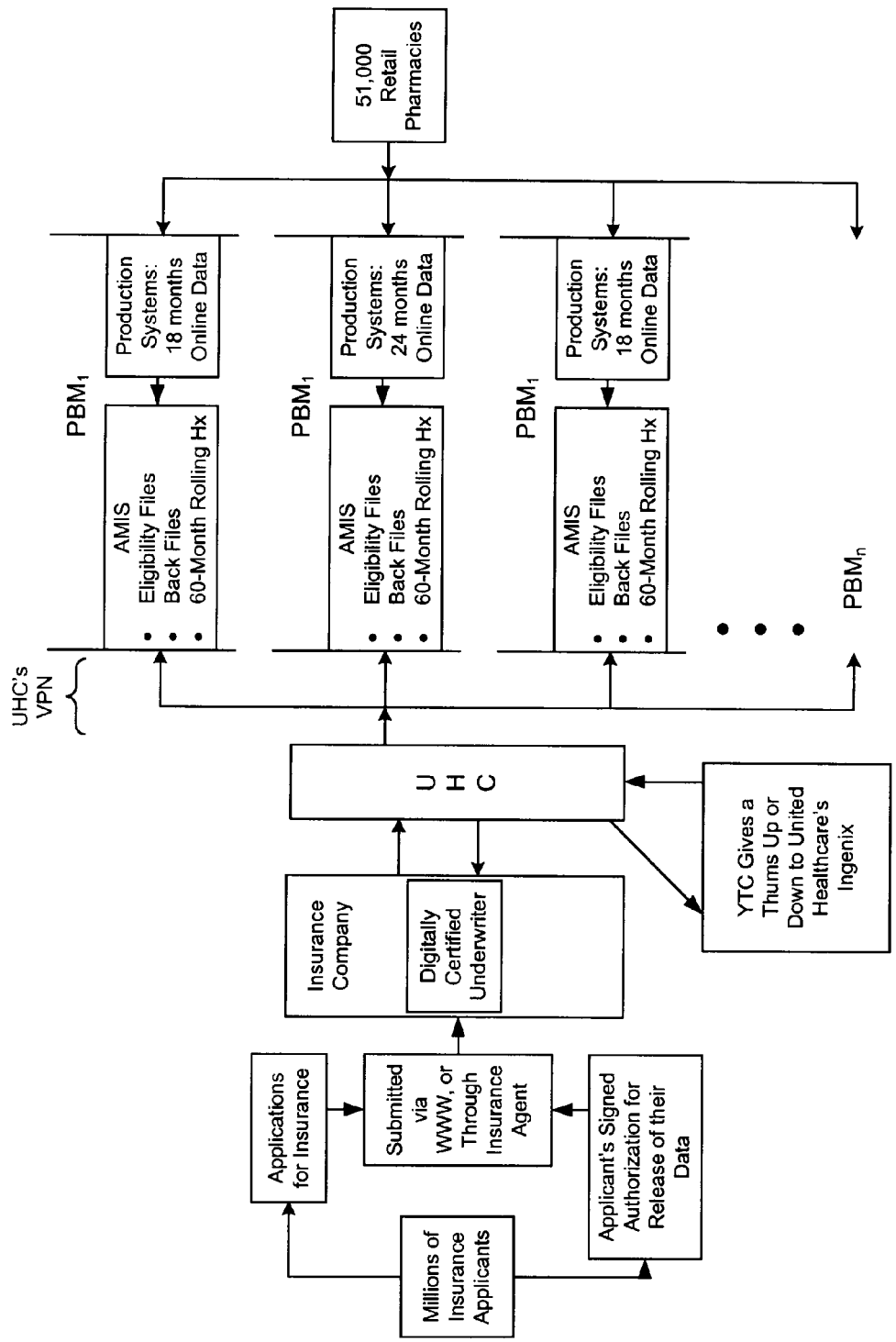
Figure 9:
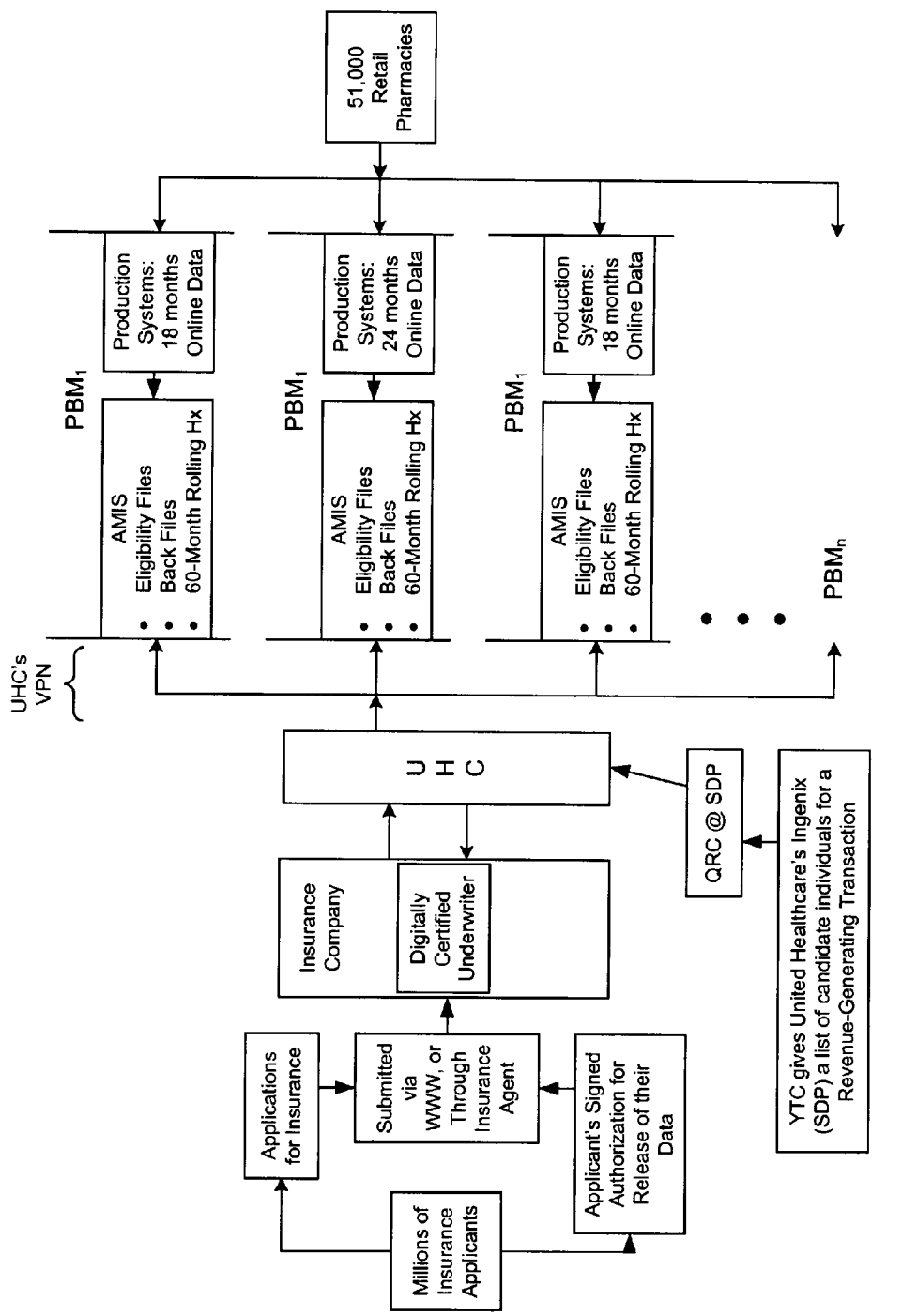
Figure 10:
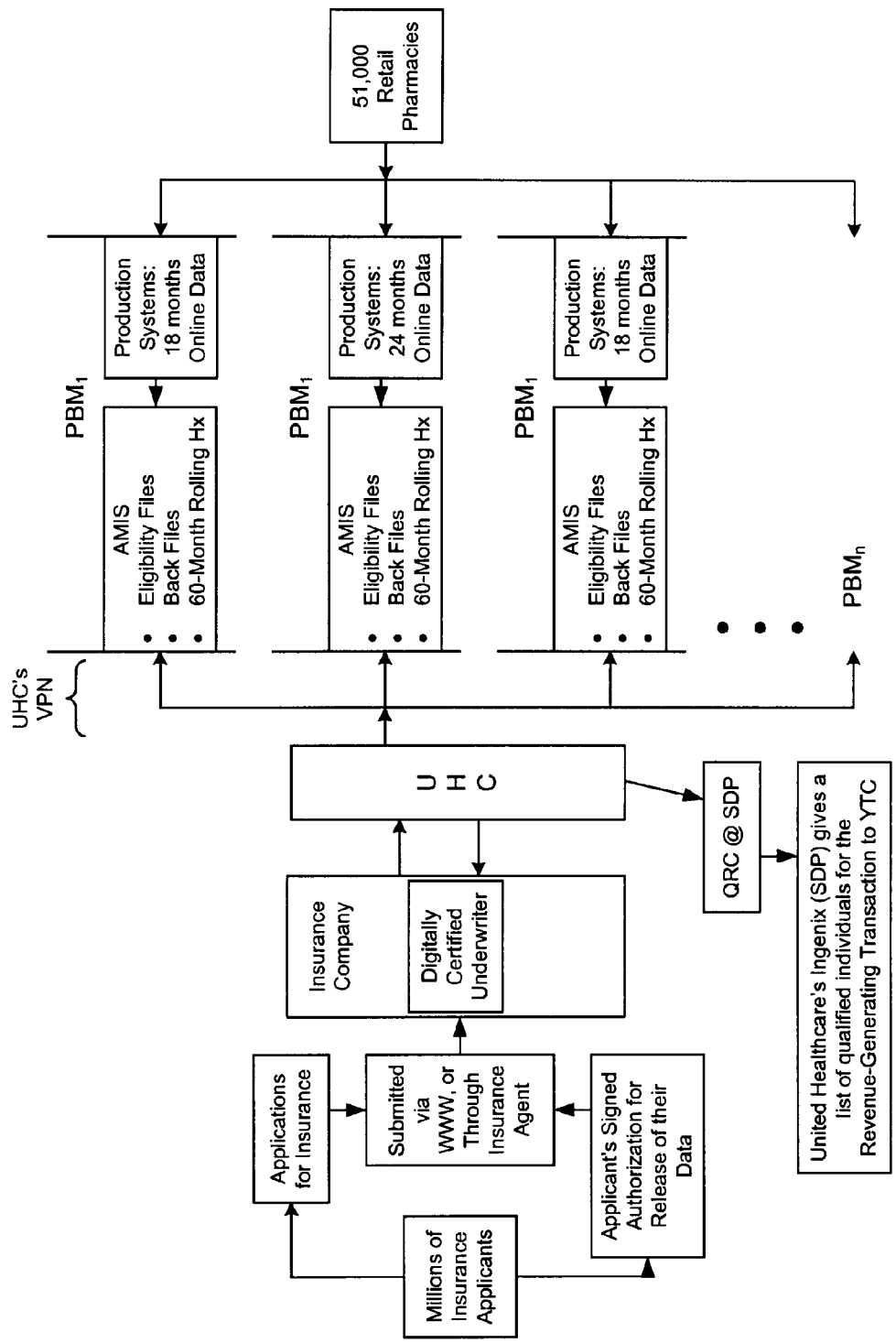

This example illustrates how YTC will enable source data providers (SDPs) to participate in new revenue-generating opportunities while also complying with all privacy laws and regulations. FIG. 7 provides a view of an example of SDPs not collaborating with YTC, while FIGS. 8-10 illustrate features of an example of an SDP—UHC's "Prescription Profile" highway with YTC collaboration.

Figure 11:
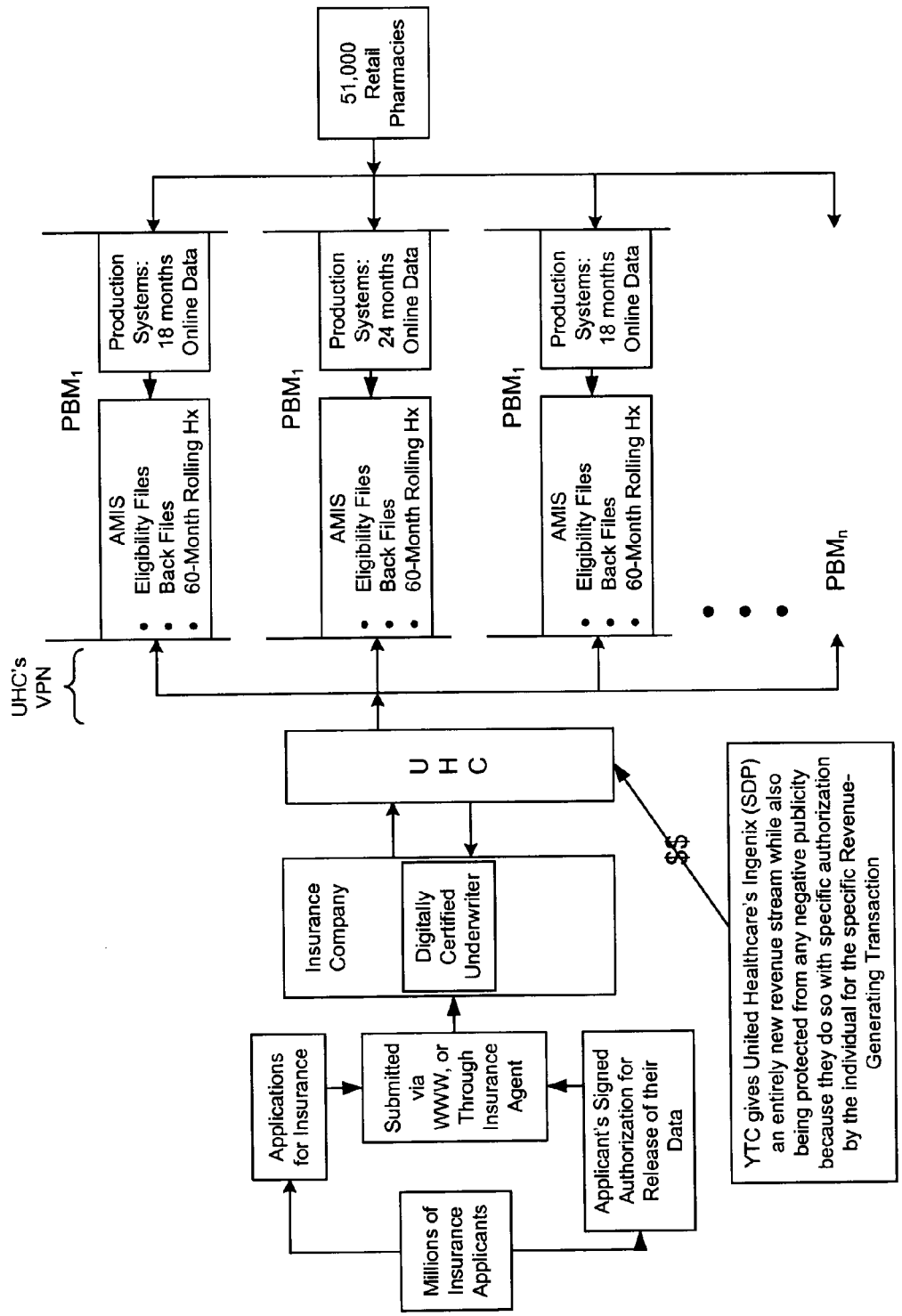

By collaborating with YTC, the SDP virtually eliminates risk of negative publicity, and the SDP will in fact dramatically increase revenues because of specific consents that are legitimately provided by the individual to use their data, creating entirely new revenue opportunities. As illustrated in FIG. 8, YTC gives a thumbs up or thumbs down to United Healthcare's Ingenix. Then, as shown in FIG. 9, YTC gives United Healthcare's Ingenix (SDP) a list of candidate individuals for a revenue-generating transaction. FIG. 10 shows how United Healthcare's Ingenix (SDP) gives a list of qualified individuals for the revenue-generating transaction to YTC. As shown in FIG. 11, YTC gives United Heathcare_3 s Ingenix (SDP) an entirely new revenue stream while also being protected from any negative publicity because they do so with specific authorization by the individual for the specific revenue-generating transaction.

EXAMPLE 6

Figure 12:
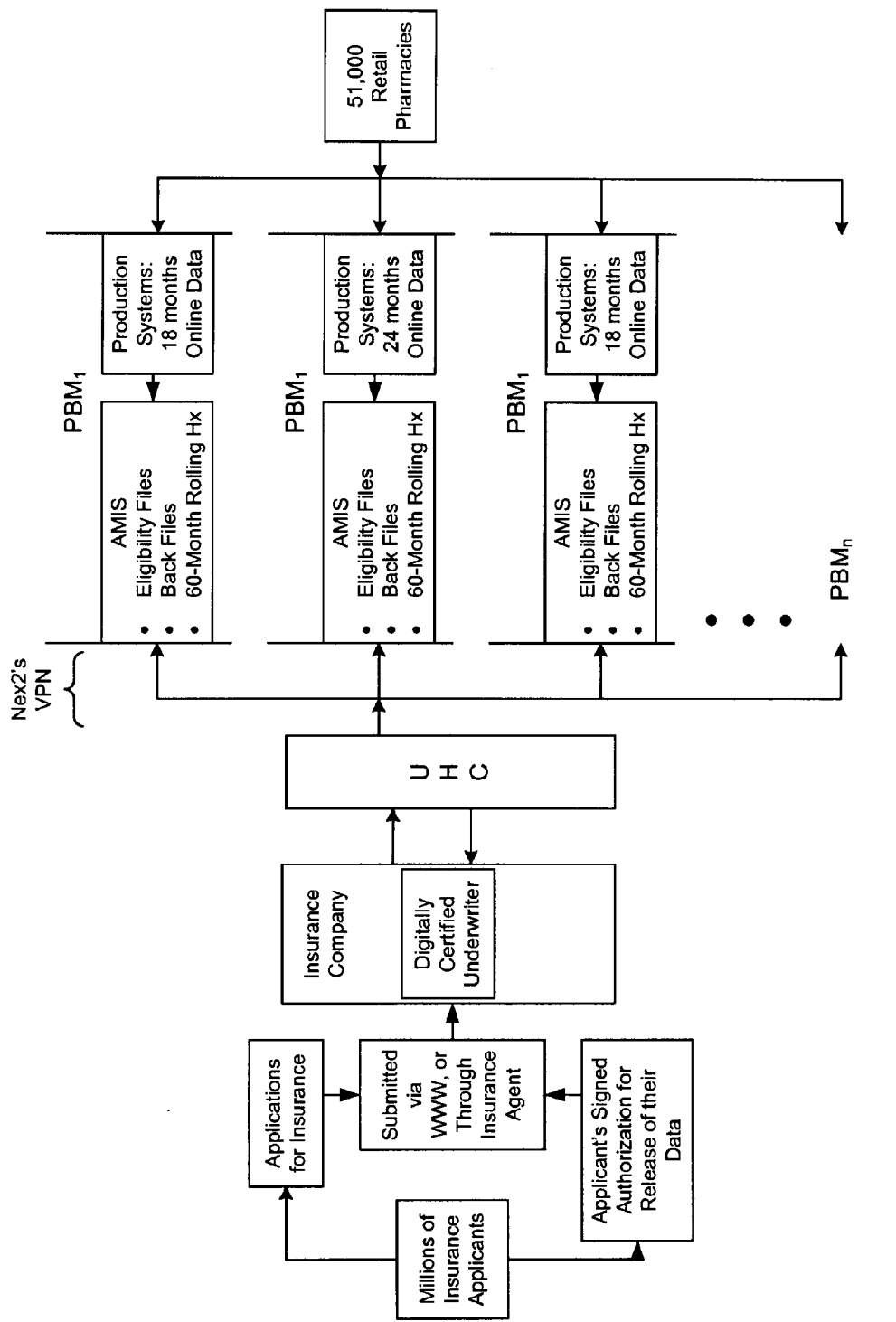
FIGS. 12-13 illustrate an example of how collaboration between SDPs and a database service protect the SDPs from potentially negative and destructive publicity while enabling new-found revenues.
Figure 13:
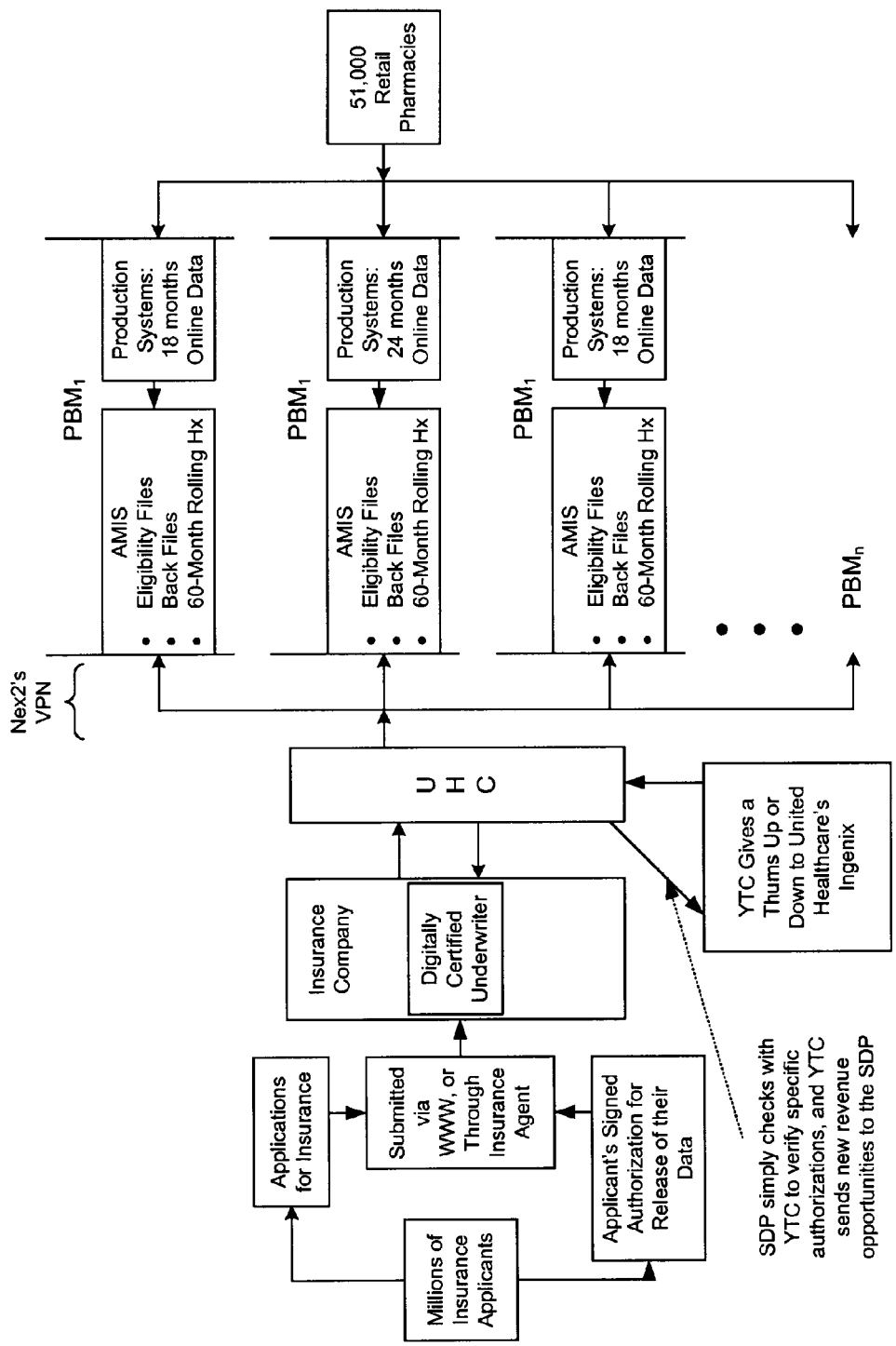

This example illustrates how YTC protects source data providers (SDPs) from potentially negative and destructive publicity while enabling new-found revenues. This example is illustrated by FIGS. 12 and 13. Without the SDP's collaboration with YTC, it is only a matter of time until disaster strikes with lots of negative publicity (e.g. on "60 Minutes") resulting in a precipitous drop in revenues. However, as illustrated in FIG. 13, by the SDP collaborating with YTC, the SDP virtually eliminates risk of negative publicity, and the SDP will in fact dramatically increase revenues because of specific consents that are legitimately provided by the individual to use their data for entirely new revenue opportunities. The SDP simply checks with YTC to verify specific authorizations, and YTC sends new revenue opportunities to the SDP.

While the release of medical records to health-care professionals was mentioned as one possible application of the present invention, one skilled in the art will understand that there are many other possible applications, which include, but are not limited to application in the pharmaceutical industry, especially with respect to dealing with personal information relating to prescriptions; education, especially with respect to personal educational records; the financial industry, including information such as bank records and credit history reports; as well as application to any other area which implicates personal information, especially those that would aid one in identity theft; In addition, with respect to the application of the present invention to the medical industry, the present invention applies both to privatized and socialized medical systems, as well as to any other type of health-care systems.

What is claimed is:

1. A method for controlling a release of personal information comprising:
    depositing some personal information regarding an individual with a server;
    using web crawler programs to locate and retrieve publicly-available information regarding said individual from a plurality of Internet-accessible sources;
    presenting said some personal information over a wide area computer network to said individual to review and verify said some personal information's accuracy;
    accepting commentary on the accuracy of said some personal information based on review from said individual, wherein said commentary includes explanations of incorrect information on said server;
    obligating organizations that possess additional personal information regarding said individual to not disclose said additional personal information without authorization from said server; and
    instructing said server to not release said some personal information held on the server and to not authorize release of said additional personal information at the obligated organizations without receiving authorization from said individual.

2. The method of claim 1, wherein said server is Internet-accessible.

3. The method of claim 1, wherein using web crawler programs to locate and retrieve publicly-available information regarding said individual from a plurality of Internet-accessible sources occurs automatically.

4. The method of claim 1 wherein said individual is a member of a database service.

5. The method of claim 1 wherein said personal information comprises database entries.

6. The method of claim 1 wherein said obligated organizations are subscribers to a database service.

7. The method of claim 1, wherein obligating organizations that possess additional personal information regarding said individual to not disclose that additional personal information without authorization from said server comprises:
    receiving a disclosure from said individual at said server identifying said organizations that possess said additional personal information;
    contacting said organizations that possess said additional personal information with said server; and
    receiving a contractual agreement from said organizations that possess said additional personal information to not release said additional personal information to third parties without first contacting said server for authorization.

8. A method for creating a database of verified personal information comprising:
    using web crawler programs to locate and retrieve publicly-available information regarding said individual from a plurality of Internet-accessible sources;
    presenting said information over a wide area computer network to said individual to review and verify said information's accuracy;
    accepting commentary on the accuracy of said information based on said review from said individual over the wide area computer network, wherein said commentary includes explanations of incorrect information in said database;
    including said commentary in said database with said information;
    receiving a request over said wide area computer network from an authorized individual to review selected portions of said information;
    instructing said server to not release said some personal information held on the server and to not authorize release of said additional personal information at the obligated organizations without receiving authorization from said individual;
    presenting said request to said individual for authorization;
    presenting said selected portions of said information over said wide area computer network to said authorized individual;
    providing access to said database and said commentary to third parties; and
    obligating organizations that possess additional personal information regarding said individual to not disclose said additional personal information without authorization from said server.

9. The method of claim 8, wherein said wide area computer network is an internet.

10. The method of claim 8, wherein said the step of automatically gathering information further comprises using web crawler programs to locate and retrieve publicly-available information regarding said individual from a plurality of Internet-accessible sources.

11. The method of claim 8 wherein said individual is a member of a database service.

12. The method of claim 8 wherein said third parties are subscribers to a database service.

13. The method of claim 8 wherein said authorized individuals are members of a database service.

14. A method for creating and sharing a database of verified personal information comprising:
    using web crawler programs to locate and retrieve publicly-available information regarding said individual from a plurality of Internet-accessible sources;
    presenting said information and the sources of said information over the wide area computer network to said individual to review and verify said information's accuracy;
    accepting commentary on the accuracy of said information based on said review from said individual over the wide area computer network;
    including said commentary in said database with said information;
    receiving a request over said wide area computer network from an authorized individual to review selected portions of said information;
    instructing said server to not release said some personal information held on the server and to not authorize release of said additional personal information at the obligated organizations without receiving authorization from said individual;

presenting said request to said individual for authorization;

presenting said selected portions of said information over said wide area computer network to said authorized individual along with identification of said sources of said selected portions of said information and any commentary on the accuracy of said selected portions of said information provided by said individual;

providing access to said database and said commentary to third parties; and obligating organizations that possess additional personal information regarding said individual to not disclose said additional personal information without authorization from said server.

15. The method of claim 14, further comprising:

supplementing said information regarding the individual by a continuous gathering process;

notifying said individual of updates to said information located by said continuous gathering process; and accepting further commentary on the accuracy of said updates to said information from said individual over the wide area computer network.

16. The method of claim 14, further comprising:
receiving a search of said database from a third party that results in information about said individual being displayed to said third party; and
notifying said individual of said search and said display.

17. The method of claim 14, further comprising:
receiving additional information from said individual over the wide area computer network; and
receiving a designation from said individual designating said additional information as one of:
information to be made available to all subscribers of said database; and
information to be released only upon specific authorization of said individual.

18. The method of claim 14, wherein the commentary on the accuracy of said information comprises an indication that a portion of said information is incorrectly associated with said individual.

19. The method of claim 14, further comprising requiring said third parties to register with said database and present said database with identifying information prior to providing access to said database and to said commentary to said third parties.

* * * * *